(12) United States Patent
Lin et al.

(10) Patent No.: US 9,920,754 B2
(45) Date of Patent: Mar. 20, 2018

(54) AIR MAINTENANCE TIRE PUMP SIMULATOR

(71) Applicant: The Goodyear Tire & Rubber Company, Akron, OH (US)

(72) Inventors: Cheng-Hsiung Lin, Hudson, OH (US); Frank George Licari, Solon, OH (US); Robin Lamgaday, Wadsworth, OH (US); Arun Kumar Byatarayanapura Gopala, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/149,407

(22) Filed: May 9, 2016

(65) Prior Publication Data

US 2017/0321690 A1 Nov. 9, 2017

(51) Int. Cl.
*F04B 51/00* (2006.01)
*B60C 23/00* (2006.01)
*G01M 17/02* (2006.01)

(52) U.S. Cl.
CPC ............ *F04B 51/00* (2013.01); *B60C 23/001* (2013.01); *G01M 17/02* (2013.01)

(58) Field of Classification Search
CPC ....... F04B 51/00; B60C 23/001; B60C 23/12; G01M 17/02; G01N 17/004
USPC ........................................................ 73/865.6
See application file for complete search history.

(56) References Cited

U.S. PATENT DOCUMENTS

| 1,349,671 | A | * | 8/1920 | Hultin | ..................... B60C 23/12 |
| | | | | | 152/420 |
| 2,766,618 | A | * | 10/1956 | Stiehler | ............... G01M 17/022 |
| | | | | | 374/169 |
| 4,590,793 | A | | 5/1986 | Staats, Jr. | |
| 5,667,606 | A | * | 9/1997 | Renier | ..................... B60C 23/12 |
| | | | | | 152/418 |
| 5,928,444 | A | * | 7/1999 | Loewe | .................. B60C 23/004 |
| | | | | | 152/418 |
| 8,091,440 | B2 | | 1/2012 | Kim | |
| 8,403,091 | B2 | * | 3/2013 | Prakash | ................ B60C 23/003 |
| | | | | | 180/165 |
| 9,168,794 | B2 | | 10/2015 | Peinelt et al. | |
| 2015/0079550 | A1 | * | 3/2015 | Blansett | ................. G09B 23/12 |
| | | | | | 434/126 |
| 2015/0314657 | A1 | | 11/2015 | Lin | |
| 2015/0314658 | A1 | | 11/2015 | Lin | |

\* cited by examiner

*Primary Examiner* — Harshad R Patel
*Assistant Examiner* — Octavia Hollington
(74) *Attorney, Agent, or Firm* — Edward T. Kennedy

(57) ABSTRACT

An air maintenance tire pump simulator that simulates the environment of an air maintenance tire system is provided. The simulator includes at least one pneumatic cylinder, a structure that forms a closed cavity, and a pneumatic conduit extending between and fluidly connecting the pneumatic cylinder and the closed cavity. A cam is operably connected to a motor, and is also operably connected to the pneumatic cylinder. Engagement of the motor actuates rotation of the cam, which in turn actuates operation of the pneumatic cylinder to increase a pressure in the closed cavity. A method of simulating an air maintenance tire system is also provided.

17 Claims, 5 Drawing Sheets

| Configuration | Tube Length | Vacuum Capability |
|---|---|---|
| | inch | psi |
| Config 1-1 | 0 | 12.46 |
| Config 1-2 | 6 | 11.51 |
| Config 1-3 | 12 | 11.04 |
| | | |
| Config 2-1 | 0 | 9.46 |
| Config 2-2 | 3 | 8.79 |
| Config 2-3 | 6 | 8.0 |
| Config 2-4 | 12 | 7.19 |
| Config 2-5 | 18 | 6.6 |

AIR MAINTENANCE TIRE PUMP SIMULATOR

FIELD OF THE INVENTION

The invention relates to simulators for air maintenance tire systems, which are systems that maintain appropriate air pressure within a pneumatic tire. More specifically, the invention relates to an air maintenance tire pump simulator that simulates the environment of an air maintenance tire system to enable prediction of the behavior of the system and testing of components of the system.

BACKGROUND OF THE INVENTION

Conventional pneumatic tires are designed to perform for relatively long periods of time. In many cases, automobile tires are now expected to have a useful service life of 30,000, 50,000, or 70,000 miles. However, even long-life pneumatic tires are subject to air pressure losses due to puncture by nails and other sharp objects, temperature changes, and/or diffusion of air through the tire itself.

Since air diffusion reduces tire pressure over time, pneumatic tires may repeatedly become underinflated. Accordingly, drivers must in turn repeatedly act to maintain recommended air pressures in the vehicle tires to avoid reduced fuel economy, tire life, and/or vehicle braking and handling performance. Tire pressure monitoring systems (TPMS) are automated systems that have been proposed to warn drivers when the air pressure in the vehicle tires is significantly low. Such systems, however, remain dependent upon a driver taking remedial action, when warned, to re-inflate a tire to the recommended pressure. It had been desirable in the prior art to incorporate an air maintenance feature within a pneumatic tire that will maintain recommended air pressure without requiring bothersome driver intervention.

To this end, air maintenance tire (AMT) systems have been developed. For example, an AMT system typically includes one or more pumps that act to increase the air pressure in the vehicle tires on demand. Such systems and related components are more fully described by way of example in Published U.S. Patent Application Nos. 2015/0314658A1 and 2015/0314657A1, which are owned by the same Assignee as the present invention, that is, The Goodyear Tire & Rubber Company.

In the development of air maintenance tire systems, it is necessary to simulate the environment of the systems to accurately predict the behavior of the system and its components. In addition, it is beneficial to simulate the environment of the systems to accurately test certain components of the systems, such as pumps, control valves or regulators, filters, check valves, and the like. In the prior art, no simulators have been available that accurately simulate the environment of an air maintenance tire system.

Therefore, it is therefore desirable to provide an air maintenance tire pump simulator, which simulates the environment of an air maintenance tire system to enable prediction of the behavior of the system and testing of components of the system.

SUMMARY OF THE INVENTION

According to an aspect of an exemplary embodiment of the invention, an air maintenance tire pump simulator includes at least one pneumatic cylinder and a structure that forms a closed cavity. A pneumatic conduit extends between and fluidly connects the at least one pneumatic cylinder and the structure that forms a closed cavity. A cam is operably connected to a motor and is operably connected to the at least one pneumatic cylinder. Engagement of the motor actuates rotation of the cam, which in turn actuates operation of the at least one pneumatic cylinder to increase a pressure in the closed cavity.

In another aspect of an exemplary embodiment of the invention, a method of simulating an air maintenance tire system includes the steps of providing at least one pneumatic cylinder and providing a structure that forms a closed cavity. The pneumatic conduit is connected to the at least one pneumatic cylinder and to the structure that forms a closed cavity. A motor is provided. and a cam is operably connected to the motor. The cam is also operably connected to the at least one pneumatic cylinder. The motor is engaged to actuate rotation of the cam, and the at least one pneumatic cylinder is actuated upon rotation of the cam to increase a pressure in the closed cavity.

BRIEF DESCRIPTION OF THE DRAWINGS

The invention will be described by way of example and with reference to the accompanying drawings, in which.

Similar numerals refer to similar parts throughout the drawings.

DETAILED DESCRIPTION OF THE INVENTION

Figure 1:
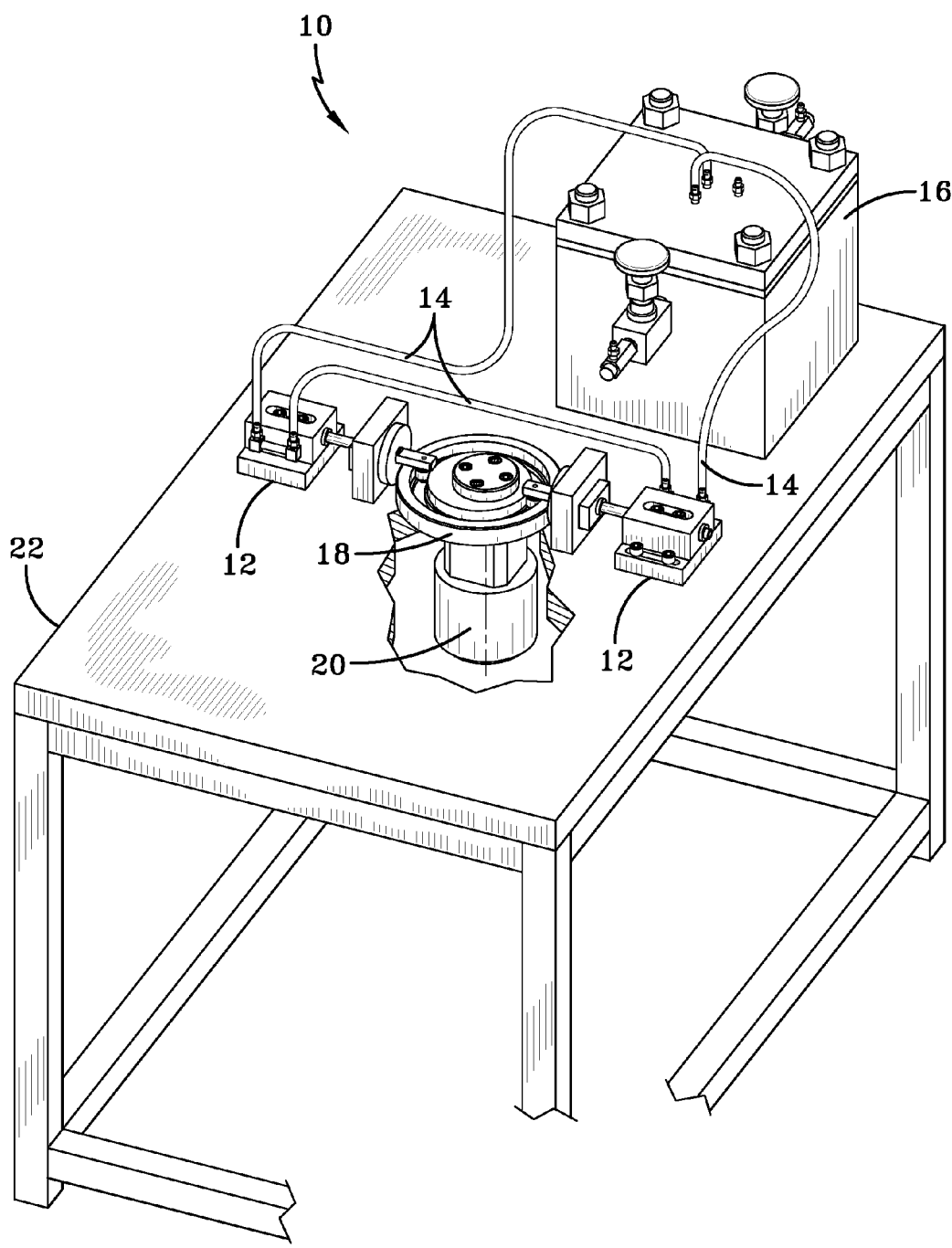
FIG. 1 is a perspective fragmentary view of an exemplary embodiment of the air maintenance tire pump simulator of the present invention, shown installed on a test table.

An exemplary embodiment of an air maintenance tire pump simulator of the present invention is indicated generally at 10 and is shown in FIG. 1. The air maintenance tire pump simulator 10 includes a plurality of pneumatic cylinders or pumps 12 that are fluidly connected to one another, such as by sections of a pneumatic conduit 14. The cylinders or pumps 12 are also fluidly connected to a structure 16, such as by sections of the pneumatic conduit 14. The structure 16 forms a closed cavity to simulate a tire cavity, as will be described in greater detail below. The cylinders 12 are actuated by a cam or wheel 18, as will also be described in greater detail below, which is driven by a motor 20. The air maintenance tire pump simulator 10 preferably is configured to seat on or be mounted on a table or bench 22 for a convenient test or simulation environment.

Figure 3:
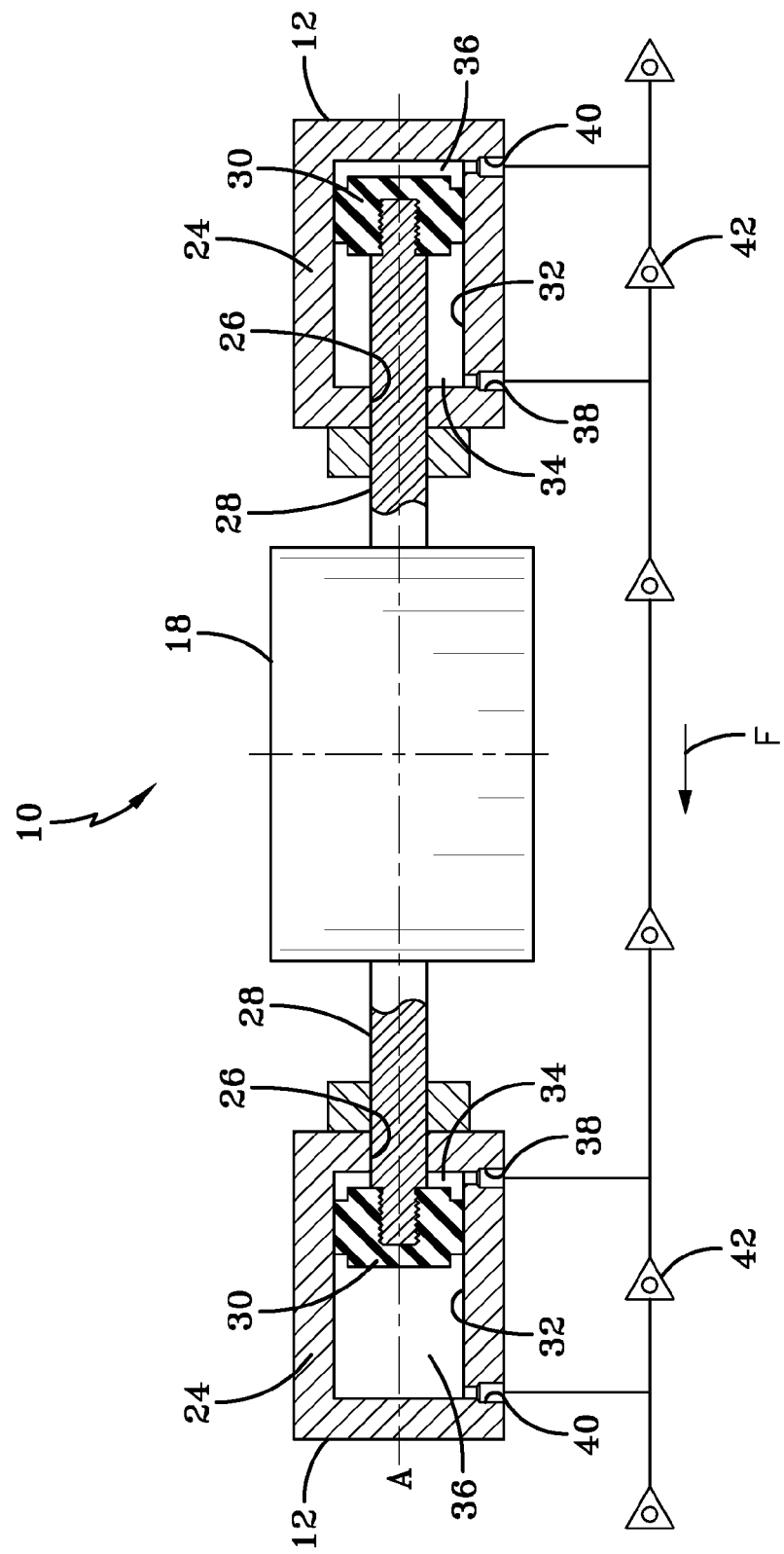
FIG. 3 is a schematic representation, partially in cross section, of the pumping configuration of the air maintenance tire pump simulator shown in FIG. 1.

With additional reference now to FIG. 3, the cylinders 12 preferably are double-action miniature pneumatic cylinders that each include two chambers per cylinder. More particularly, each cylinder 12 preferably includes a wall 24 that forms a main cavity 32. The wall 24 is also formed with an opening 26 that receives a rod 28. The rod 28 is rigidly attached to a piston 30, which is disposed in the main cavity 32 and separates the main cavity into two chambers, 34 and 36, respectively. As shown in FIG. 3, the first chamber 34 is radially inward of the piston 30 relative to the cam 18, and the second chamber 36 is radially outward of the piston. The wall 24 is further formed with two ports, 38 and 40, respectively, that enable each chamber 34 and 36 to fluidly communicate with the pneumatic conduit 14. For example, the first chamber 34 is in fluid communication with the first port 38, which is fluidly connected to the pneumatic conduit 14. Likewise, the second chamber 36 is in fluid communication with the second port 40, which is also fluidly connected to the pneumatic conduit 14.

Upon actuation of the rod 28, which will be described in detail below, the piston 30 moves within the main cavity 32 of the cylinder 12, compressing the air in one of the chambers 34 or 36. For example, the piston 30 compresses the air in the first chamber 34 and forces the compressed air through the chamber's corresponding port 38 to the pneumatic conduit 14. When the air in the first chamber 34 is compressed, a vacuum is generated in the second chamber 36. Because the cylinder 12 preferably is a double-action cylinder, when the rod 28 moves in an opposing direction, the piston 30 compresses the air in the second chamber 36 and forces the compressed air through the chamber's corresponding port 40 to the pneumatic conduit 14. When the air in the second chamber 36 is compressed, a vacuum is generated in the first chamber 34. Preferably, one or more check valves 42 are in fluid communication with the pneumatic conduit 14 to ensure air flow in one direction along the pneumatic conduit, as indicated by arrow F.

The pneumatic cylinders 12 are thus configured in a series or chain, directing compressed air through the pneumatic conduit 14 to the cavity structure 16. It is to be understood that the air maintenance tire pump simulator 10 may include any number of cylinders 12, such as four, six, eight, or more. In addition, it is to be understood that the cylinders 12 may be fluidly connected to one another and the series then fluidly connected to the cavity structure 16, or each cylinder may be directly fluidly connected to the cavity structure.

Figure 2:
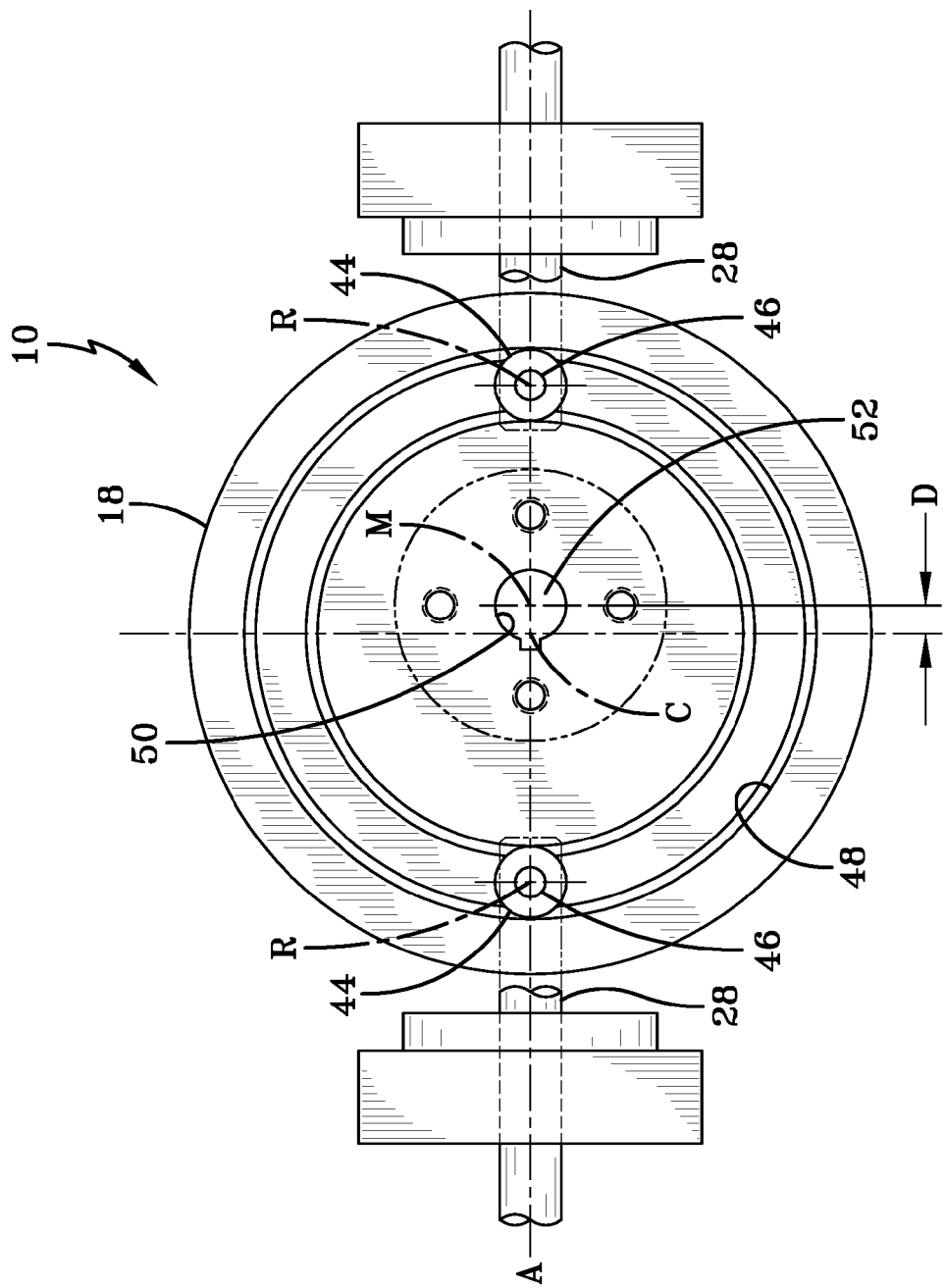
FIG. 2 is a fragmentary plan view of a portion of the air maintenance tire pump simulator shown in FIG. 1.

With particular reference now to FIGS. 1 and 2, to actuate each cylinder 12, each rod 28 is operatively connected to a respective roller 44 that is capable of rotation relative to the rod. For example, each roller 44 may be connected to its respective rod 28 by a pin connection 46. Each roller 44 is received in and seats in a circular groove 48 formed in the cam 18. The cam 18 is mounted to the motor 20 at an off-center mounting point M. More particularly, the mounting point M is separate from the center C of the cam 18, and the distance between the mounting point and the center of the cam may be expressed as distance D. By way of example, the cam 18 may be formed with an opening 50 at the mounting point M, which engages the output shaft 52 of the motor 20, which is a direct current (DC) motor. Upon actuation, the motor 20 drives rotation of the cam 18 at the mounting point M. Because the mounting point M is separated from the center C of the cam 18 by distance D, the cam rotates in an eccentric manner.

The rotation of the cam 18 causes the rollers 44 that are seated in the groove 48 to rotate about each respective roller axis R. Because the cam 18 rotates in an eccentric manner, the relative position of each roller 44 moves according to the eccentric rotation of the cam, which actuates movement of the respective rod 28 that is connected to each roller. The connection of each rod 28 to its respective roller 44 by a pin connection 46 enables each rod to move linearly along its respective longitudinal axis A as the cam 18 rotates. When each rod 28 moves along its respective longitudinal axis A, each respective piston 30 moves within the main cavity 32 of the cylinder 12, as described above. As shown in FIG. 3, due to the eccentric pattern of rotation of the cam 18, when the rod 28 of one cylinder 12 moves in a first direction, such as toward compression of air in its first chamber 34, the rod of an opposing cylinder moves in a second or opposing direction, such as toward compression of air in its second chamber 36. As the cam 18 rotates, the movement of each rod 28 is reversed, compressing the air in the opposite chamber 34, 36 of each respective cylinder. In this manner, the eccentric rotation of the cam 18 provides an efficient stroke operation for all of the cylinders 12. Such a structure for the air maintenance tire pump simulator 10 enables multiple pumps to be actuated by a single cam 18 and a single motor 20, with a fixed stroke length and controlled displacement of multiple chambers 34, 36 in each cylinder 12.

As described above, as the piston 30 moves within the main cavity 32 of the cylinder 12, it compresses the air in one of the chambers 34 and 36, and forces the compressed air through that chamber's corresponding port 38 or 40 to the pneumatic conduit 14. The compressed air from each cylinder 12 flows through the conduit 14 to the cavity structure 16. The cavity structure 16 is an isolated volume that simulates the pneumatic cavity in a tire and is in fluid communication with each cylinder 12. As compressed air flows to the cavity structure 16 from the cylinders 12, the pneumatic pressure in the cavity structure increases. It is to be understood that, while the cavity structure 16 has been described as forming a closed cavity, the cavity is in fluid communication with the pneumatic cylinders 12 and other components of the air maintenance tire pump simulator 10.

To simulate an air maintenance tire system, the cavity structure 16 is pressurized to a predetermined level, such as about one hundred (100) pounds per square inch gauge (psig), as measured by a pressure indicating device that is in fluid communication with the interior of the cavity structure. The pressure indicating device may be any device known to those skilled in the art, such as an analog or digital pressure transducer.

This structure of the air maintenance tire pump simulator 10 simulates the environment of an air maintenance tire system, thereby enabling prediction of the behavior of the system and testing of components of the system. For example, the air maintenance tire pump simulator 10 of the present invention simulates the environment and performance of the air maintenance tire systems described in Published U.S. Patent Application Nos. 2015/0314658A1 and 2015/0314657A1, which are owned by the same Assignee as the present invention, that is, The Goodyear Tire & Rubber Company. Such systems operate to increase the pneumatic pressure in a tire by employing pulse pumping, which is the incremental compression and pumping of air by a series of small pumps in pulses. In the air maintenance tire pump simulator 10, the rotation of the cam 18 simulates the dynamic motion and thus the flow of the air maintenance tire pump configuration. More particularly, the rotation of the cam 18 actuates compression and pumping by cylinders 12 in the same manner as tire or wheel rotation actuates air maintenance tire pumps.

The air maintenance tire pump simulator 10 of the present invention is tunable or adaptable without changing air cylinders or stroke setup. For example, the pumping frequency of cylinders can be adjusted by changing the speed of rotation of the cam 18 through adjustment of the speed of the motor 20. In addition, the pumping capability of the air maintenance tire pump simulator 10 can reach different pressure levels with the same number and type of air cylinders 12, which enables the simulator to simulate different tire volumes and different tire pressures. The simulation of such different tire volumes and different tire pressures is performed by adjusting the pneumatic connection volume of the simulator 10, such as by increasing or decreasing the length of the respective sections of the pneumatic conduit 14 that interconnect the cylinders 12. The simulation of such different tire volumes and different tire pressures may also be performed by adjusting the position of the cylinders 12 relative to the cam 18, which changes the stroke length of the cylinders without the need to change the structure of the cylinders.

The ability of the air maintenance tire pump simulator 10 to be adjusted is indicated by measurements of the pumping efficiency of the simulator. To measure the pumping efficiency of the simulator 10, a control valve is used to pneumatically isolate the cavity structure 16 from the rest of the simulator. Once the cavity structure 16 is isolated from the rest of the simulator 10, the pressure in a selected area in the pneumatic conduit 14 can be measured to determine the pumping effect of the cylinders 12. The pumping effect of the cylinders 12 may be measured as a pressure increase, or alternatively, as a vacuum generated in the selected area of the pneumatic conduit 14. As described above, when air is compressed in the first chamber 34 of each cylinder 12, a vacuum is generated in the second chamber 36. Likewise, when air is compressed in the second chamber 36 of each cylinder, a vacuum is generated in the first chamber 34. A measurement of vacuum generated by the cylinders 12 may be convenient and is accurate since such a measurement provides an indication of the pumping efficiency of the cylinders.

Figure 4:
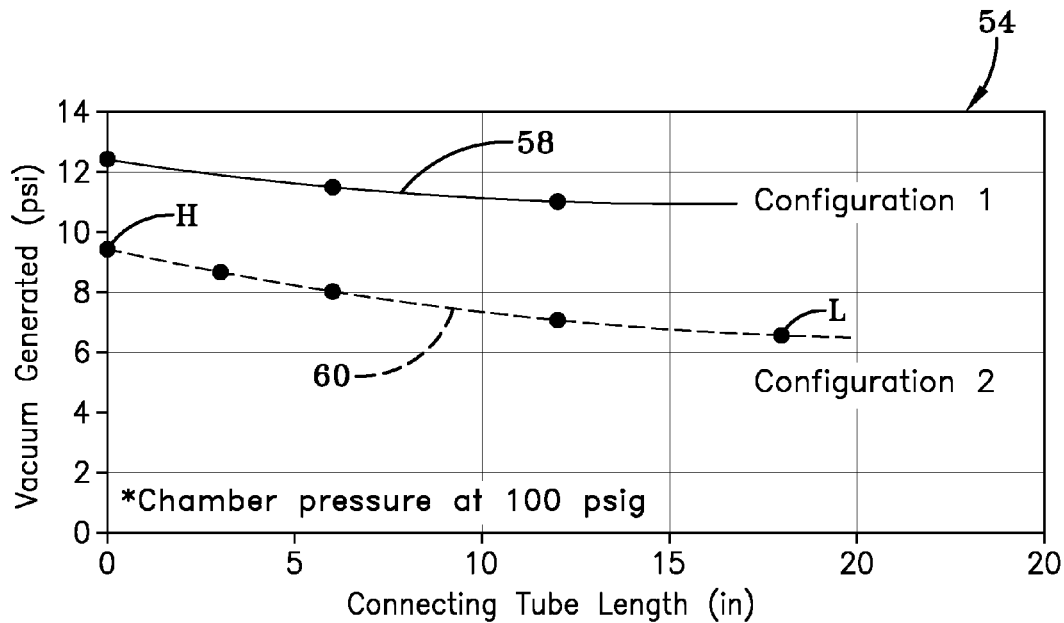
FIG. 4 is a graphical representation of the vacuum generated by the air maintenance tire pump simulator shown in FIG. 1 versus the connecting tube lengths of the system.

Turning now to FIG. 4, the results of the simulation of different tire volumes and different tire pressures by adjusting the pneumatic connection volume of the simulator 10 is shown. Graph 54 is a plot of the vacuum generated in pounds per square inch (psi) of the air maintenance tire pump simulator 10 versus the length of each section of the pneumatic conduit 14 in inches (in) that was used to interconnect each of two cylinders 12. Table 56 displays the data points that are plotted in the graph 54. Line 58 shows that, in a first configuration of the simulator 10, as the length of each section of the pneumatic conduit 14 increased, the vacuum generated decreased. Thus, the pumping efficiency of the cylinders 12 of the simulator 10 decreased as the system volume increased. Likewise, line 60 shows that, in a second configuration of the simulator 10, as the length of each section of the pneumatic conduit 14 increased, the vacuum generated decreased. These lines 58 and 60 indicate an accurate simulation of an air maintenance tire system. Moreover, point L on line 60 is representative of the pressure of a lightly-loaded tire, while point H is representative of the pressure of a heavily-loaded tire. These points L, H indicate that the air maintenance tire pump simulator 10 can be adjusted or tuned to simulate different tire volumes and different tire pressures.

Figure 5:
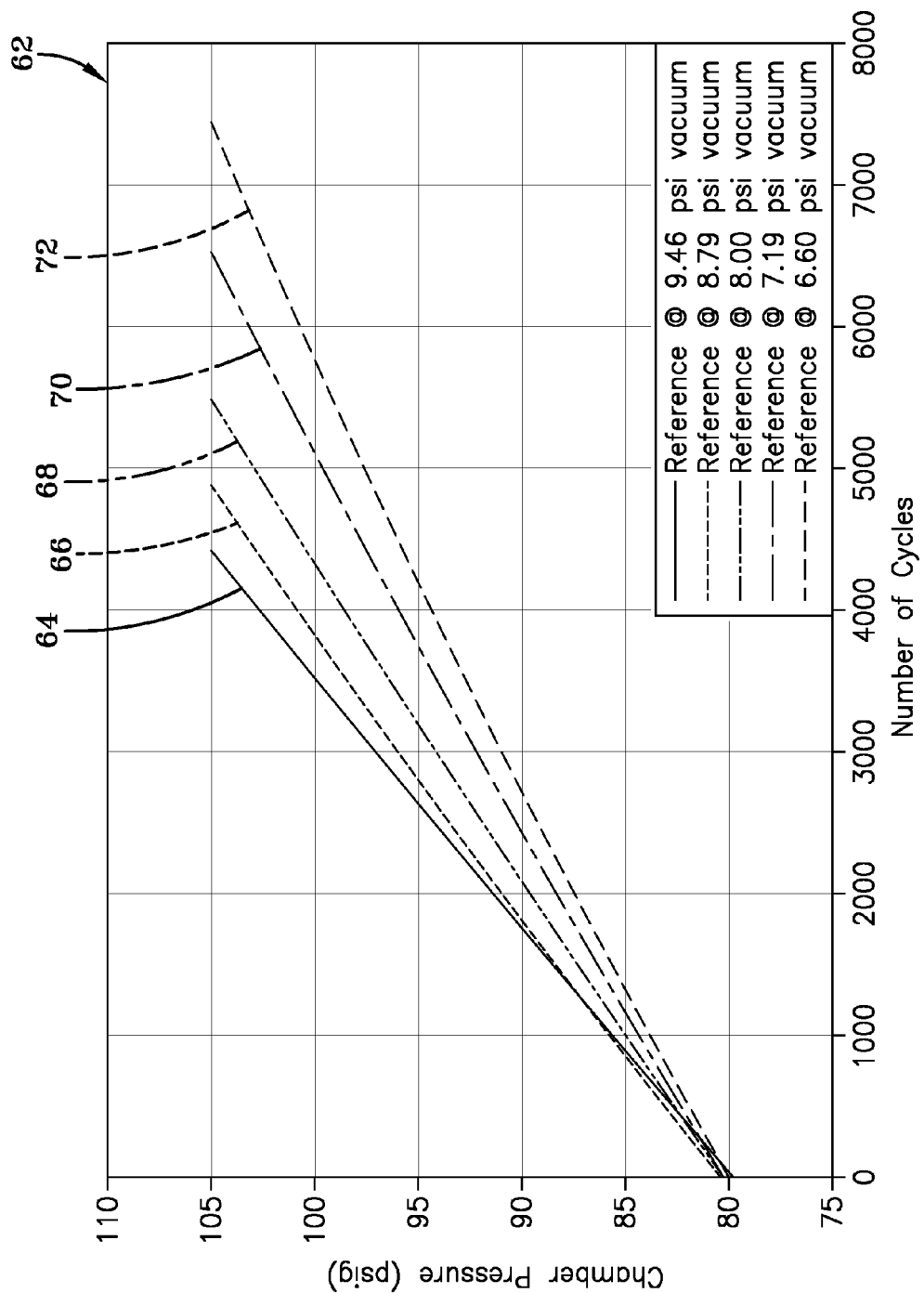
FIG. 5 is a graphical representation of the chamber pressure versus the number of cycles of the air maintenance tire pump simulator shown in FIG. 1.

The simulation of pumping behavior by the air maintenance tire pump simulator 10 is shown in FIG. 5. Graph 62 illustrates the effect the pumping ability of the simulator 10 on a reference pressure. The pressure level of the cavity structure 16 versus the number of pump cycles of the cylinders 12 to increase the pressure from about 80 psig to about 105 psig was plotted, using five different volume or vacuum configurations. The graph 62 indicates that, as the number of pumping cycles increased, the pressure in the cavity structure 16 increased. In addition, each of the lines 64, 66, 68, 70, and 72 in graph 62 indicates that a more efficient pumping configuration, as indicated by a higher level of vacuum, increased the pressure in the cavity structure 16 from about 80 psig to about 105 psig in fewer cycles. Thus, a more efficient pumping configuration increased the tire pressure in fewer cycles. These results illustrate the effectiveness of the air maintenance tire pump simulator 10 in simulating the environment of an air maintenance tire system for different tire volumes and pressures.

In this manner, the air maintenance tire pump simulator 10 of the present invention provides a simulator that accurately represents air maintenance tire pump behavior and enables prediction of the performance of the air maintenance tire system. The simulator 10 thus provides the ability to evaluate the air maintenance tire system before the building of tires and/or wheels that incorporate the system.

The air maintenance tire pump simulator 10 of the present invention also enables testing and evaluation of the components of an air maintenance tire system. More particularly, a control valve or regulator, filter, and/or check valve may be pneumatically connected to the pneumatic conduit 14 in a removable manner and the performance of the simulator 10 measured. The resulting measurement may indicate if the component is functioning properly. For example, one or more of the cylinders 12 may be interchanged with a pump that is to be employed in an air maintenance tire system, or a pump that is to be employed in an air maintenance tire system may be connected to simulator 10 in addition to the cylinders 12. The performance of the simulator 10 with the new pump may then be measured to indicate whether the new pump is functioning properly. In this manner, components of an air maintenance tire system may easily be interchanged with components of the simulator 10, or added to the simulator, for testing and evaluation.

The above-described structure of the air maintenance tire pump simulator 10 of the present invention enables the simulator to simulate an air maintenance tire system that includes components that are mounted inside of a tire or components that are mounted outside of a tire. In addition, control of the air maintenance tire pump simulator 10 of the present invention may be exercised through pneumatic or electronic controls, including manually-actuated controls or automated controls. For example, the speed of the motor 20 and valve controls may be manually adjusted with a pneumatic controller, and pressure readouts may be on local indicators. Alternately, the speed of the motor 20 and valve controls may be automatically adjusted with an electronic controller, and pressure readouts may be on a central indicator, with a suitable central electronic controller or control system.

The present invention also includes a method of simulating an air maintenance tire system, including the testing of components of an air maintenance tire system. The method includes steps in accordance with the description that is presented above and shown in FIGS. 1 through 5.

It is to be understood that the structure of the above-described air maintenance tire pump simulator may be altered or rearranged, or components known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:
1. An air maintenance tire pump simulator comprising:
   at least one pneumatic cylinder;
   a structure that forms a closed cavity;
   a pneumatic conduit extending between and fluidly connecting the at least one pneumatic cylinder and the structure that forms the closed cavity;

a motor; and
a cam being mounted to the motor, and being operably connected to the at least one pneumatic cylinder, whereby engagement of the motor actuates rotation of the cam, thereby actuating operation of the at least one pneumatic cylinder to increase a pressure in the closed cavity.

2. The air maintenance tire pump simulator of claim 1, wherein the cam is mounted to the motor at a mounting point that is separate from the center of the cam, whereby upon actuation by the motor, the cam rotates in an eccentric manner.

3. The air maintenance tire pump simulator of claim 2, further comprising at least one check valve in fluid communication with the pneumatic conduit to ensure air flow in a selected direction along the pneumatic conduit.

4. The air maintenance tire pump simulator of claim 1, wherein the at least one pneumatic cylinder includes a plurality of cylinders, and the cylinders are pneumatically configured in a series to direct compressed air to the structure that forms the closed cavity.

5. The air maintenance tire pump simulator of claim 1, wherein the at least one pneumatic cylinder includes a plurality of cylinders, and each one of the cylinders is directly fluidly connected to the structure that forms the closed cavity.

6. The air maintenance tire pump simulator of claim 1, wherein the at least one pneumatic cylinder is a double-action pneumatic cylinder, and includes:
a wall forming a cavity, the wall also being formed with an opening;
a rod received in the opening formed in the wall; and
a piston being attached to the rod and being disposed in the cavity, whereby the piston separates the main cavity into two chambers.

7. The air maintenance tire pump simulator of claim 6, wherein:
the cam is formed with a circular groove;
a roller is received in the groove; and
the rod is operatively connected to the roller, whereby rotation of the cam actuates linear movement of the rod.

8. The air maintenance tire pump simulator of claim 1, wherein a length of at least one section of the pneumatic conduit is capable of being adjusted to simulate at least one of a selected tire pressure and a selected tire volume.

9. The air maintenance tire pump simulator of claim 1, wherein a position of the at least one pneumatic cylinder relative to the cam is capable of being adjusted to simulate at least one of a selected tire pressure and a selected tire volume.

10. The air maintenance tire pump simulator of claim 1, wherein selected components of an air maintenance tire system are removably fluidly connected to the pneumatic conduit for testing.

11. The air maintenance tire pump simulator of claim 1, further comprising a central controller operatively connected to the simulator to control operation of the simulator.

12. A method of simulating an air maintenance tire system, the method comprising the steps of:
providing at least one pneumatic cylinder;
providing a structure that forms a closed cavity;
connecting a pneumatic conduit to the at least one pneumatic cylinder and to the structure that forms the closed cavity;
providing a motor;
mounting a cam to the motor;
operably connecting the cam to the at least one pneumatic cylinder;
engaging the motor to actuate rotation of the cam; and
actuating the at least one pneumatic cylinder upon rotation of the cam to increase a pressure in the closed cavity.

13. The method of simulating an air maintenance tire system of claim 12, wherein the step of operably connecting the cam to the at least one pneumatic cylinder further comprises:
inserting a roller into a groove formed in the cam; and
operatively connecting a rod of the at least one pneumatic cylinder to the roller.

14. The method of simulating an air maintenance tire system of claim 12, further comprising the step of adjusting a length of at least one section of the pneumatic conduit to simulate at least one of a selected tire pressure and a selected tire volume.

15. The method of simulating an air maintenance tire system of claim 12, further comprising the step of adjusting a position of the at least one pneumatic cylinder relative to the cam to simulate at least one of a selected tire pressure and a selected tire volume.

16. The method of simulating an air maintenance tire system of claim 12, further comprising the step of removably connecting selected components of an air maintenance tire system to the pneumatic conduit for testing.

17. An air maintenance tire pump simulator comprising:
at least one pneumatic cylinder, wherein the at least one pneumatic cylinder is a double-action pneumatic cylinder, and includes:
a wall forming a cavity, the wall also being formed with an opening;
a rod received in the opening formed in the wall; and
a piston being attached to the rod and being disposed in the cavity, whereby the piston separates the main cavity into two chambers;
a structure that forms a closed cavity;
a pneumatic conduit extending between and fluidly connecting the at least one pneumatic cylinder and the structure that forms the closed cavity;
a motor; and
a cam being operably connected mounted to the motor, and being operably connected to the at least one pneumatic cylinder, whereby engagement of the motor actuates rotation of the cam, thereby actuating operation of the at least one pneumatic cylinder to increase a pressure in the closed cavity.

* * * * *